Dec. 10, 1929.   J. F. SCHYLANDER   1,738,800
SOLDERING APPARATUS
Filed May 13, 1927   2 Sheets-Sheet 1
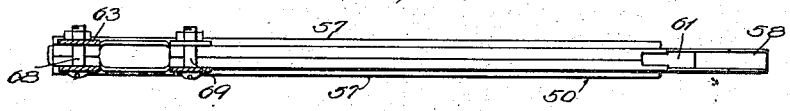
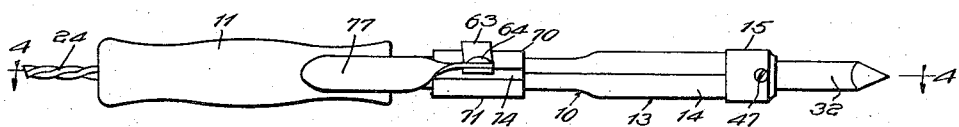
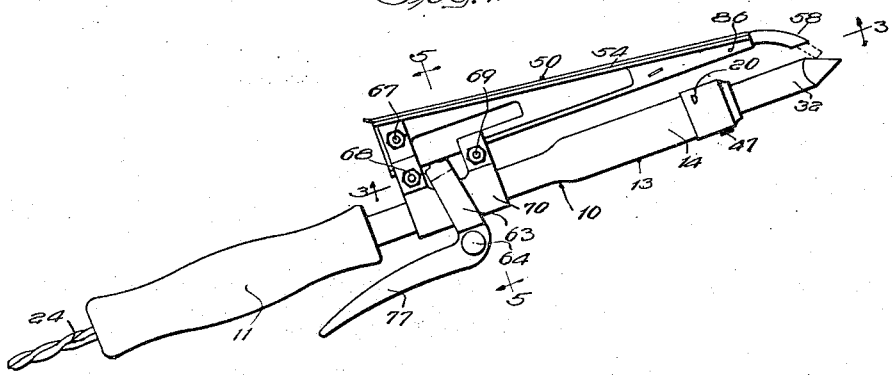
Witness:
William P. Kilroy
Inventor:
John F. Schylander Dec. 10, 1929.                J. F. SCHYLANDER                1,738,800
                                SOLDERING APPARATUS
                                Filed May 13, 1927           2 Sheets-Sheet 2
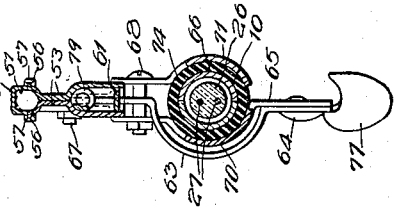
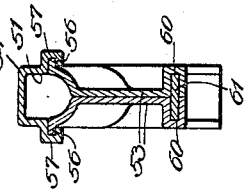
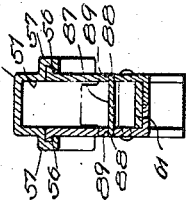
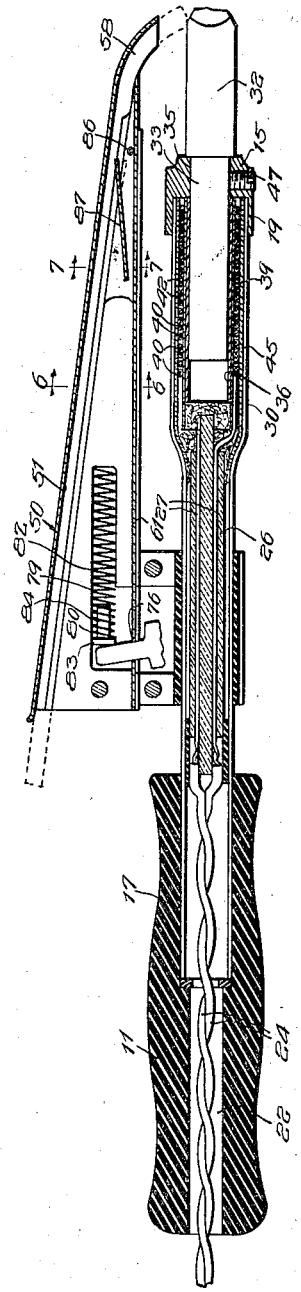
Witness:
William P. Kilroy
Inventor:
John F. Schylander
Hill & Hill
By            Attys Patented Dec. 10, 1929

1,738,800

UNITED STATES PATENT OFFICE

JOHN F. SCHYLANDER, OF CHICAGO, ILLINOIS

SOLDERING APPARATUS

Application filed May 13, 1927. Serial No. 191,144.

My invention relates to soldering apparatus and particularly to apparatus for supplying solder to the tips of soldering irons, or the equivalent.

The invention has among its other objects the production of apparatus of the kind described which can be produced economically in commercial quantities.

Another particular object of the invention is to provide apparatus of the kind described which may be formed mainly by stamping operations so that the cost of the apparatus will be relatively small.

Another particular object of the invention is to provide improved apparatus of the kind described which may be attached to a soldering iron and comprises means that may be readily, quickly and easily manipulated to feed solder to the tip of the iron.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 1 is a side elevation of apparatus which embodies the invention;

Fig. 2 is a top plan view of the apparatus shown in Fig. 1;

Fig. 3 is a section taken on line 3—3 of Fig. 1;

Fig. 4 is an enlarged section taken on line 4—4 of Fig. 2;

Fig. 5 is a section taken on line 5—5 of Fig. 1;

Fig. 6 is a section taken on line 6—6 of Fig. 4; and

Fig. 7 is a section taken on line 7—7 of Fig. 4.

The apparatus shown in the accompanying drawings resembles the apparatus which is shown in the drawings of my copending application, Serial No. 72,289, filed November 30, 1925.

Referring to the drawings, the reference character 10 designates generally a soldering iron which preferably comprises a hollow handle 11 formed of wood, or the equivalent. Projecting from the hollow handle 11 is a shank which is designated generally by the reference character 13. As best shown in Figs. 2 and 5, the shank 13 is preferably formed from complementary members 14, the members 14 being preferably formed from sheet metal by stamping operations. The members 14 are held against displacement relative to each other by the hollow handle 11 and by a collar 15, the handle 11 being provided with a bore 17 into which the members 14 project and the collar 15 being provided with a recess 19 into which the members 14 project. The collar 15 is preferably secured to one of the members 14 by a lug 20 which is stamped into the collar in such manner that it projects into the aligned members 14 (Fig. 1).

As best shown in Fig. 4, the handle 11 is provided with a bore 22 which registers with the bore 17 and accommodates electrical conductors 24 whereby the soldering iron may be operatively connected to any suitable source of electrical energy (not shown). Arranged in the shank 13 is an insulating member 26 which is preferably formed from some refractory material such as porcelain, clay, or the equivalent. As shown, the insulating member 26 is provided with bores 27 adapted to accommodate the conductors 24 and to hold them spaced from each other to prevent short circuiting. Each of the members 14 is enlarged at one end to provide a relatively large cylindrical portion 30 into which one end of a soldering tip 32 projects. The soldering tip 32 may be of any suitable size and shape but is preferably provided with a substantially cylindrical shank 33 adapted to be inserted in a bore 35 formed in the collar 15, the shank 33 being preferably of such length that it extends a relatively large distance into the enlarged portion 30 of the member 14. Disposed within the enlarged portion 30 of the member 14 is a metallic sleeve 36 which is preferably formed from brass, or the equivalent, the internal diameter of the sleeve being substantially equal to the external diameter of the shank 33 so that the sleeve will engage the shank. Wrapped around the sleeve 36 is a sheet 39 of mica and wrapped around the sheet 39 are a plurality of turns of an electrical conductor 40 which serves as a resistance element. The resistance element 40 may be of any suitable design but preferably comprises a wire wrapped around a strand of asbestos which is, in turn, wrapped around the sheet 39 of mica, the several turns of the resistance wire around the sheet 39 being insulated from each other by strands 42 of asbestos. Wrapped around the resistance wire 40 and the strands 42 is a second sheet 45 of mica which fits snugly within the enlarged portion 30 of the shank 13. A set-screw 47 screw-threaded into the collar 15 is engageable with the shank 33 to secure the tip 32 to the shank 13. The conductors 24 are connected to the ends of the resistance element 40.

Spaced from the shank 14 and secured thereto by means hereinafter described is a frame which is designated generally by the reference character 50 and preferably comprises a tube 51 through which a strand of solder may be advanced to the tip 32. As best shown in Figs. 4 to 7, inclusive, the frame 50 preferably comprises a pair of stamped plates 53 which cooperate with each other and a stamped member 54 to provide the tube 51. Each of the plates is provided with a flange 56 engageable with one of a pair of oppositely disposed grooves 57 formed in the stamped member 54, the stamped member 54 being preferably substantially U-shaped in cross section. Obviously, the stamped member 54 prevents displacement of the plates 53 relative to each other. The forward end of the stamped member 54 is preferably curved as at 58 to form a continuation of the tube 51, the curvature of the forward end of the stamped member 54 being such that it guides the solder to the tip 32. As best shown in Fig. 6, the plates 53 are formed in such manner that they provide oppositely disposed grooves 60 adapted to guide a plunger 61 which is preferably flexible and somewhat resilient. The plunger 61 may be longitudinally displaced to cause its forward end to project into the curved part 58 of the stamped member 54 so that the forward end of the plunger will engage the solder and advance it toward the tip 32.

The means for longitudinally displacing the plunger 61 preferably comprises a lever 63 which is pivoted by a pin 64 to a clamping member 65. The clamping member 65 and an aligned clamping member 66 are detachably secured to the frame 50 by bolts 67, 68 and 69, or the equivalent. The bolt 67 passes through the plates 53 but the bolts 68 and 69 are positioned below the plates 53 and may be manipulated to clamp the clamping members 65 and 66 to the frame 50 and the shank 13. It will be noted that the clamping members 65 and 66 are provided with arcuate portions 70 and 71, respectively, which encircle the shank 13 but are preferably spaced therefrom by a sleeve 74 which is preferably formed from fiber, or the equivalent. The sleeve 74 insulates the clamping members 65 and 66 from the shank 13 in such manner that heat does not readily flow from the soldering iron to the clamping members and the frame 50. One end of the lever 63 projects through an aperture 76 formed in the plunger 61 and the other end of the lever forms a finger piece 77 disposed adjacent the handle 11, the construction being such that when the operator holds the soldering apparatus by the handle 11, the lever 77 may be readily manipulated by the first finger of the hand. Obviously, if the lever 63 is displaced in a clockwise direction (Fig. 1), the plunger 61 will be displaced to the right (Fig. 4) to advance the solder toward the tip 32.

The plunger is preferably retracted by means comprising a compression spring 79 and a pin 80, the spring 79 and the pin 80 being mounted in a tubular recess 82 formed by and between the plates 53. As best shown in Fig. 4, the pin 80 is provided with a head 83 engaging the lever 63 and with a shank 84 which projects into the spring 79. The arrangement is such that when the lever 63 is angularly displaced to cause the plunger 61 to feed solder to the tip 32, the spring 79 will be compressed and then when the pressure is removed from the finger piece 77, the spring 79 will elongate and retract the plunger 61 and the lever 63.

The forward ends of the plates 53 are preferably secured to each other by a rivet 86, or the equivalent. Disposed between the forward ends of the plates 53 is a leaf spring 87 which is provided with laterally projecting lugs 88 arranged in apertures 89 formed in the plates 53. The leaf spring 87 is constructed so that its free end engages the solder in the tube 51 and prevents accidental displacement thereof when it is not being advanced through the tube.

The operation of the above described apparatus is substantially as follows: The resistance element 40 is connected to any suitable source of electrical energy by means of the conductors 24 and a strand of solder is inserted in the tube 51 in such manner that its forward end may be operatively engaged by the forward end of the plunger 61 when the plunger 61 is longitudinally displaced to the right (Fig. 4). Then the lever 63 is displaced in a clockwise direction (Fig. 1) against the action of the spring 79 each time it is necessary to feed solder to the tip 32 and such displacement of the lever 63 causes the plunger 61 to advance the solder a predetermined distance through the tube 51 so that a predetermined amount of solder will be delivered to the tip 32. As set forth above, the plunger 61 is retracted by the spring 79.

The frame 50 and the parts carried thereby may be quickly mounted as a unit upon the shank of the soldering iron and may be quickly removed therefrom. The tip 32 may be quickly replaced at any time as it is only necessary to loosen the screw 47 whereupon the tip may be removed from the soldering iron and replaced by another tip which may then be secured in place by tightening the screw 47.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. Apparatus for feeding solder to the tip of a soldering iron, said apparatus comprising a plurality of plates, a member cooperating with said plates to form a tube through which solder may be advanced to said tip, a plunger slidably journaled between said plates and engageable with the solder, clamping means for securing said plates to said soldering iron, and means movably mounted upon said clamping means for displacing said plunger to advance said solder toward said tip.

2. Apparatus for feeding solder to the tip of a soldering iron, said apparatus comprising a plurality of plates, a member cooperating with said plates to form a tube through which solder may be advanced to said tip, a plunger slidably journaled between said plates and engageable with the solder, clamping means for securing said plates to said soldering iron, means movably mounted upon said clamping means for displacing said plunger to advance said solder toward said tip, and yielding means disposed between said plates for retracting said plunger.

3. Apparatus for feeding solder to the tip of a soldering iron, said apparatus comprising a pair of similar plates, said plates having portions contiguous to each other and portions diverging from each other, a member cooperating with said diverging portions to form a tube through which solder may be advanced to said tip, said plates also having portions cooperating to form a tube, a plunger slidably disposed in said last named tube for engaging the solder, clamping means for securing said plates to said soldering iron, means movably mounted on said clamping plates for displacing said plunger to advance said solder towards said tip, and yielding means disposed between said plates for retracting said plunger.

4. Apparatus for feeding solder to the tip of a soldering iron, said apparatus comprising a pair of similar plates, said plates having portions contiguous to each other and portions diverging from each other, a U-shaped member cooperating with said diverging portions to form a tube through which solder may be advanced to said tip, said plates also having portions cooperating to form a tube, a plate like plunger slidably disposed in said last named tube for engaging the solder, clamping means for securing said plates to said soldering iron, means movably mounted on said clamping plates for displacing said plunger to advance said solder towards said tip, and yielding means disposed between said plates for retracting said plunger.

5. Apparatus for feeding solder to the tip of a soldering iron, said apparatus comprising a plurality of plates, a member cooperating with said plates to form a tube through which solder may be advanced to said tip, a plunger slidably journaled between said plates and engageable with the solder, clamping means for rigidly securing said plates to said soldering iron, means movably mounted upon said clamping means for displacing said plunger to advance said solder toward said tip, and yielding means disposed between said plates for retracting said plunger.

In testimony whereof, I have hereunto signed my name.

JOHN F. SCHYLANDER.